(12) United States Patent
Völker et al.

(10) Patent No.: US 11,619,294 B2
(45) Date of Patent: *Apr. 4, 2023

(54) GEAR UNIT HAVING A SHAFT

(71) Applicant: SEW-EURODRIVE GMBH & CO. KG, Bruchsal (DE)

(72) Inventors: Konstantin Völker, Bruchsal (DE); Peter Barton, Bretten (DE); Stefan Dietrich, Karlsruhe (DE); Anette Bunka, Eggenstein-Leopoldshafen (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 2096 days.

This patent is subject to a terminal disclaimer.

(21) Appl. No.: 14/410,990

(22) PCT Filed: Jun. 4, 2013

(86) PCT No.: PCT/EP2013/001624
§ 371 (c)(1),
(2) Date: Dec. 23, 2014

(87) PCT Pub. No.: WO2014/005666
PCT Pub. Date: Jan. 9, 2014

(65) Prior Publication Data
US 2015/0192197 A1    Jul. 9, 2015

(30) Foreign Application Priority Data

Jul. 6, 2012   (DE) .................... 10 2012 013 351.0

(51) Int. Cl.
*F04D 29/28*    (2006.01)
*F16H 57/04*    (2010.01)
(Continued)

(52) U.S. Cl.
CPC ......... *F16H 57/0416* (2013.01); *F04D 17/16* (2013.01); *F04D 29/281* (2013.01);
(Continued)

(58) Field of Classification Search
CPC .... F16H 57/0416; F04D 17/16; F04D 29/281; F04D 29/4226
See application file for complete search history.

(56) References Cited

U.S. PATENT DOCUMENTS 3,692,428 A * 9/1972 Bubb .................... F04D 29/282
                                                       416/187
4,253,800 A * 3/1981 Segawa .................... F01D 5/10
                                                       415/119
5,755,555 A * 5/1998 Swift .................... F04D 17/164
                                                       415/206

(Continued)

FOREIGN PATENT DOCUMENTS

CN    201065933 Y    5/2008
CN    201599396 U    10/2010
(Continued)

OTHER PUBLICATIONS

1996, Sato, JPH08219681A English Translation (Year: 1996).*
International Search Report, dated Jul. 31, 2013, issued in corresponding International Application No. PCT/EP2013/001624.
International Preliminary Report on Patentability, dated Jan. 22, 2015, issued in corresponding International Application No. PCT/EP2013/001624.

*Primary Examiner* — Michael L Sehn
(74) *Attorney, Agent, or Firm* — Carter, DeLuca & Farrell LLP (57) ABSTRACT

A gear unit having a shaft, particularly an input shaft, a fan impeller being joined in rotatably fixed manner to the shaft, a fan cowl, which at least partially surrounds the fan impeller, being mounted on the gear housing, a separating (Continued)

plate for separating the pressure chamber of the fan from the suction chamber of the fan being joined to the fan cowl, the separating plate having an air inlet for the fan impeller and being disposed on the side of the fan impeller facing away axially from the gear unit.

21 Claims, 6 Drawing Sheets

(51) Int. Cl.
    *F04D 17/16*     (2006.01)
    *F04D 29/42*     (2006.01)
    *F16H 57/02*     (2012.01)

(52) U.S. Cl.
    CPC ......... *F04D 29/4226* (2013.01); *F16H 57/02* (2013.01); *F16H 2057/02026* (2013.01)

(56) References Cited

U.S. PATENT DOCUMENTS 6,729,859 B2 * 5/2004 Masters .............. F04D 29/4213
                                                                   310/62
7,827,878 B2    11/2010 Langer

FOREIGN PATENT DOCUMENTS

| | | |
|---|---|---|
| DE | 10 2005 031 197 | 1/2007 |
| DE | 10 2007 008 658 | 8/2008 |
| DE | 10 2007 009 366 | 8/2008 |
| DE | 10 2008 010 912 | 8/2008 |
| GB | 1 094 709 | 12/1967 |
| GB | 2 048 382 | 12/1980 |
| GB | 2 282 206 | 3/1995 |
| JP | 08-105521 | 4/1996 |
| JP | 08219681 A * | 8/1996 |
| JP | 10-61754 | 3/1998 |

* cited by examiner

GEAR UNIT HAVING A SHAFT

FIELD OF THE INVENTION

The present invention relates to a gear unit having a shaft.

BACKGROUND INFORMATION

German Published Patent Application No. 10 2007 009 366 A1 describes a fan impeller having a jet effect.

German Published Patent Application No. 10 2005 031 197 A1 describes a fan in which the incident flow is transferred to a surface inclined by 30°.

SUMMARY

Therefore, an object of the present invention is to further develop a gear unit having a shaft in the most compact manner possible, thus, to permit the greatest possible performance accompanied by the smallest possible volume.

Important features of the present invention with regard to the gear unit having a shaft, especially an input shaft, are that a fan impeller is joined in rotatably fixed fashion to the shaft, a fan cowl, which at least partially surrounds the fan impeller, being mounted on the gear housing, a separating plate for separating the pressure chamber of the fan from the suction chamber of the fan being joined to the fan cowl, the separating plate having an air inlet for the fan impeller and being disposed on the side of the fan impeller facing away axially from the gear unit.

The advantage in this context is that the pressure chamber is separated from the suction chamber by a simple thin and inexpensive sheet metal, especially sheet steel. This permits especially effective cooling of the gear unit, since re-swirling or feedback of the air flow delivered by the fan is prevented.

In particular, the fan has a fan impeller which has an upper and a lower cover disk that are set apart from each other axially, and fan blades of the fan impeller are located between the cover disks, the separating plate having an air inlet for the fan impeller and being disposed on the side of a cover disk of the fan impeller facing away axially from the gear unit.

This is advantageous because the air is conducted in channels of the fan impeller, the channels being formed by the fan blades and the cover disks. In addition, the air inlet may be realized by the centrally placed opening in the separating plate in such a way that the air is fed directly into the channels of the fan impeller, and the least possible turbulence and eddy losses come about in the admission area. The opening in the separating plate corresponds essentially to the opening diameter of the fan-impeller air inlet facing the separating plate.

In one advantageous development, the fan impeller is a radial-flow fan impeller, in particular, the fan blades of the fan impeller being set apart irregularly from each other in the circumferential direction. The advantage in this case is that a fan impeller may be used which operates energy-efficiently and exhibits only insignificant noise generation.

In one advantageous refinement, the separating plate is detachably joined to the fan cowl. The advantage here is that by exchanging the separating plate, optionally fan impellers of different size may be provided in the fan cowl.

In one advantageous development, the separating plate adjoins the fan impeller, a spacing being provided which prevents the separating plate and fan impeller from touching, but permits no substantial return flow from the pressure chamber into the suction chamber. This is advantageous because no friction losses occur, and nevertheless, no return flow of the delivered air flow occurs.

In one advantageous refinement, the fan cowl and/or the gear housing is/are rectangular
and/or
the outside diameter of the fan impeller is greater than the width of the gear housing and/or less than the height of the gear housing. The advantage in this case is that the air flow delivered is able to be guided along the gear housing.

In one advantageous embodiment, air baffles are disposed between the fan cowl and gear housing to prevent or decrease swirl of the air flowing out of the fan cowl, the air baffles being set apart axially from the fan impeller, especially with the distance h1. This offers the advantage that the least turbulent air flow possible exits from the fan or at least from the fan cowl surrounding the fan.

In one advantageous refinement, the fan cowl is formed as a nozzle in the air-outlet area, so that a discharging air flow streams along the gear housing. This is advantageous because the discharge velocity is able to be increased.

In one advantageous development, a cover plate is set apart axially from the separating plate, so that the air is admitted from the radial direction, in particular, the cover plate having cutouts to permit air to flow in axially, as well. The advantage in this case is that air enters essentially uniformly from all angles at circumference.

In one advantageous embodiment, the fan cowl, especially together with the separating plate, is realized as a stamped bent part, in particular, the nozzle being implemented by placing one edge of the fan cowl in the air-outlet area, the inclination angle being especially between 10° and 40°. This is advantageous because the nozzle may be produced in an easy manner, particularly by bending. The angular range indicated permits an energy-efficient increase in velocity.

In one advantageous embodiment, the outside radius of the fan impeller is greater than the width of the gear unit and less than the height of the gear unit. The advantage in this context is that the exiting air flow discharges along the sides of the gear unit.

In other exemplary embodiments according to the present invention, optionally a fan impeller is installed whose outside radius is less than the width of the gear unit and less than the height of the gear unit. In this instance, the radius of the opening in the separating plate is then in turn made correspondingly small, thus, with the outside radius of the fan-impeller air-inlet area formed by the channels in the fan impeller.

In one advantageous refinement, the air baffles extend radially from the gear housing to the fan cowl. This offers the advantage that a simple anti-swirl effect is attainable. In addition, the air baffles may in each case be shaped to be flat and very thin-walled, so that an essentially purely radial extension is achieved.

In one advantageous embodiment, the fan impeller has an upper and a lower cover disk which are set apart axially from each other, and fan blades are disposed between the cover disks, so that channels are formed, the channel cross-section increasing monotonically from the inlet location on the fan impeller lying radially further inside to the outlet location on the fan impeller lying radially further outside, in particular, the inlet location being implemented at an axial position, thus, the inlet-location area especially being an area extending only radially and in the circumferential direction, and the outlet-location area being an area extending in the radial direction, in the circumferential direction and in the axial direction. The advantage here is that a diffuser effect is achievable, and nevertheless, the fan produces a delivery action. Thus, on one hand, the air is conveyed radially to the outside, and on the other hand, a high pressure is built up. Therefore, upon exit of the air from the fan cowl, a high discharge velocity is achievable with the aid of the nozzle which converts the pressure built up by the fan into a high discharge velocity. In addition, the air flow conveyed radially to the outside has an axial component, since the outlet-location area extends in all three directions. Therefore, the outlet-location area of the fan impeller facilitates a deflection of the radially conveyed air flow into the axial direction, in the process, the fan cowl additionally being effective for the complete deflection in the axial direction.

In one advantageous development, at least one of the cover disks is conical. This is advantageous because a weak diffuser effect, thus, the correspondingly slight increase of the channel cross-section radially to the outside is achievable in an easy manner.

DETAILED DESCRIPTION

As shown in the figures, a fan 5 is mounted in rotatably fixed manner on input shaft 8 of gear unit 6. A fan cowl 9 which surrounds fan 5 is disposed on the gear housing.

The gear unit is in the form of a bevel gear, which is why input shaft 8 is supported in a conical pot-type housing part 11 that is joined to the housing of gear unit 6.

Fan 5 includes a radial-flow fan impeller whose fan blades 7 extend radially, especially only radially. This permits air to be delivered regardless of the direction of rotation.

The radial-flow fan impeller has an upper cover disk 10 and a lower cover disk 13, between which fan blades 7 are located. Upper cover disk 10 and lower cover disk 13 are thus set apart axially from each other. Fan blades 7 cover the axial intermediate area between upper and lower cover disks 10, 13.

Fan cowl 9 has a separating plate 1 which extends radially and is situated at an axial position located on the side facing away axially from the gear unit having conical pot-type housing part 11. Separating plate 1 has a centrally placed opening, so that the air is admitted from the axial direction. However, the opening in separating plate 1 is small enough that the admitted air does not strike the outer edge of the fan impeller. To that end, the inside diameter of the opening in separating plate 1 is smaller than the maximum outside diameter of fan 5.

Because fan 5 is mounted on the input shaft of the gear unit implemented as a reduction gear, fan 5 is located on the shaft rotating the fastest, namely, input shaft 8.

Fan cowl 9 deviates the air flow delivered by fan 5 out of the radial direction into the axial direction. With the aid of means producing narrowings, a nozzle 3 is achieved in the axial discharge area, and therefore an increased discharge velocity.

The discharge openings of fan cowl 9 are disposed on its side facing away from the input in such a way that the exiting air flow streams along the gear housing.

Figure 3:
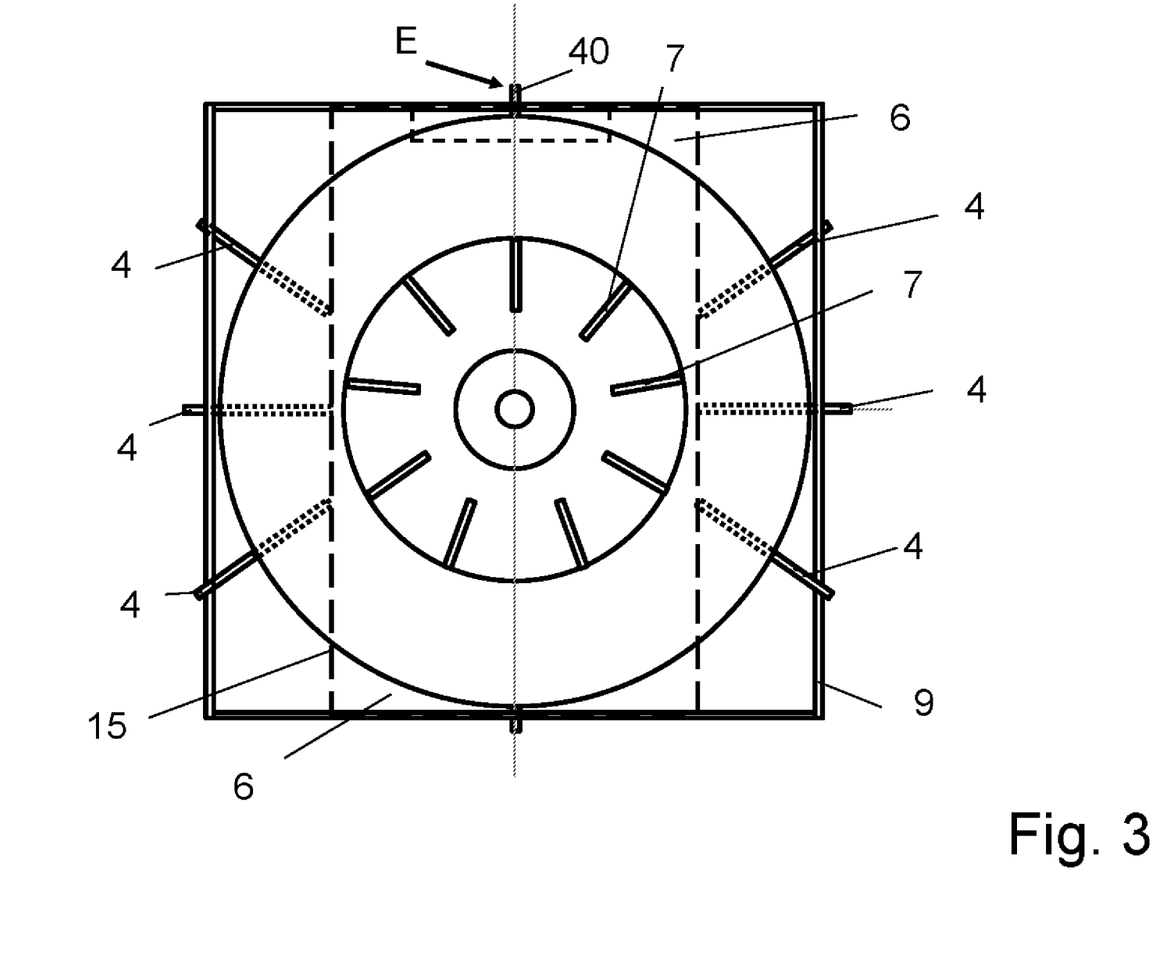
FIG. 3 shows a view in the axial direction.

However, as evident in the plan view from FIG. 3, the gear unit is essentially cuboidal, so that the front side has a basically rectangular contour. Fan cowl 9 likewise has a rectangular shape which preferably is essentially square and in particular, has a larger cross-sectional area than fan 5 and the gear housing, particularly in the plan view according to FIG. 3.

The gear housing is indicated with dashed lines in FIG. 3.

The maximum outside diameter of fan 5 is greater than the width of the gear housing but less than the height of the gear housing. In the same way, the fan cowl is wider than the width of the gear housing. The discharge opening between fan 5 and the gear housing is therefore large; in particular, it corresponds approximately to the difference between the width of fan cowl 9 and the width of the gear housing.

To prevent swirl in the air flow delivered by fan 5, fan cowl 9 has extending, radially aligned air baffles 4. Consequently, the angular momentum of the air flow delivered is thus reduced. In this context, each of the air baffles extends from the fan cowl to the gear housing. The radial extension is different depending on the angle-at-circumference position of respective air baffle 4. Thus, air baffles 4 act as anti-turbulence plates for the discharging air flow.

The diameter of fan 5 is smaller than the height of the gear housing.

Upper cover disk 10 is conical, the cone tip being removed. The opening thus provided acts as air inlet and has a diameter which is less than or the same as the diameter of the air-inlet opening provided by separating plate 1.

After the air inlet into the delivery channel of fan 5, said delivery channel being bounded in the circumferential direction by fan blades 7, channel cross-section Q2 increases from inlet cross-section Q1 until it reaches outlet cross-section Q3. Preferably, the growth, thus, the increase in cross-section Q2 is monotonic. On one hand, the fan thus acts as diffuser, but on the other hand, a conveying effect is provided in the radial direction owing to the implementation as a radial-flow fan. Consequently, a relatively high pressure is generated, accompanied by relatively low flow velocity of the radial-flow fan.

Lower cover disk 13 is preferably flat, thus, extends in the radial direction and in the circumferential direction.

Figure 1:
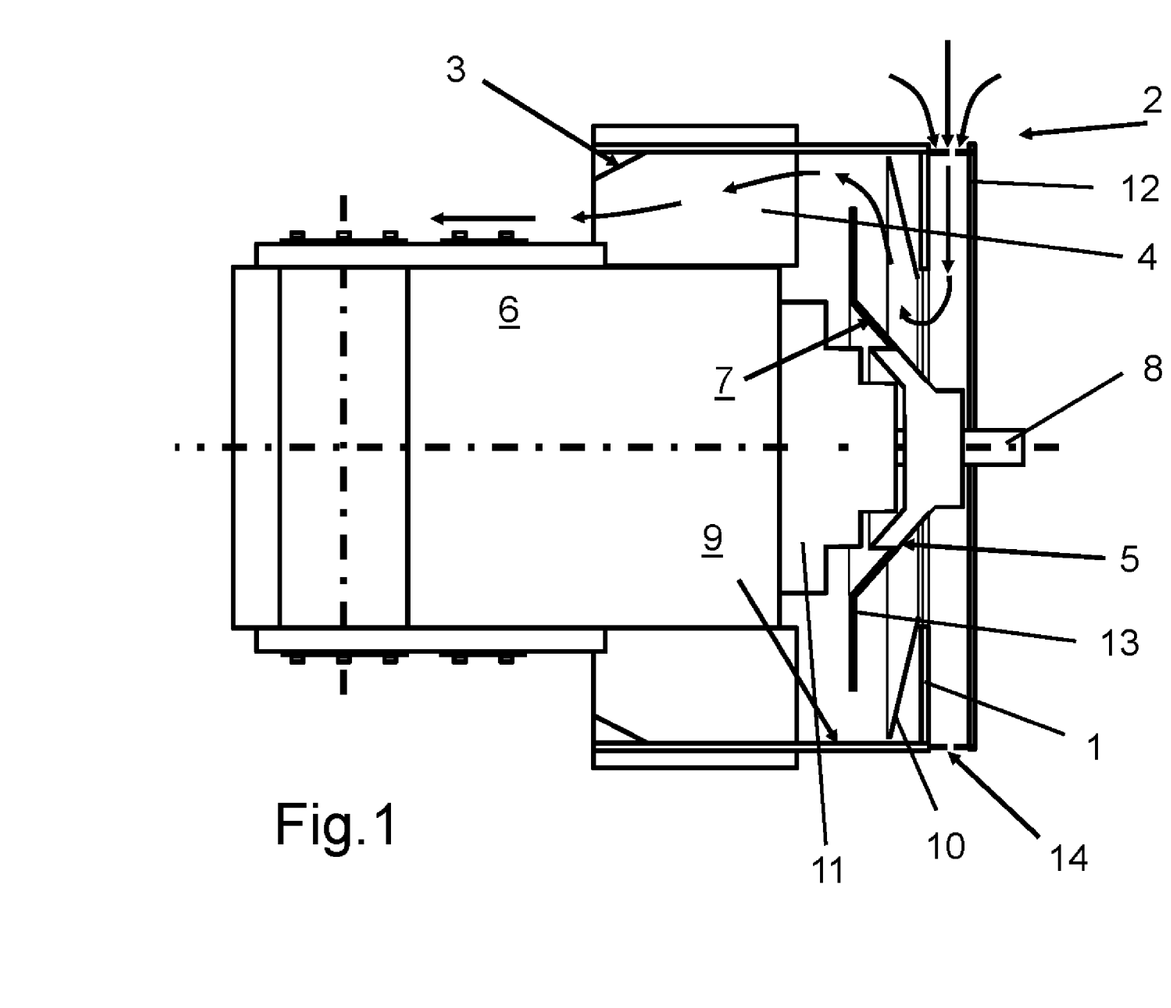
FIG. 1 shows schematically in an intersected plan view, a gear unit according to the present invention with attached fan 5.

As shown in FIG. 1, the air is admitted into the area surrounded by fan cowl 9 from the radial direction, because the associated opening opens through in the radial direction into the surrounding area.

With the aid of cover plate 12, the air which has entered is conducted radially further inward and flows there in the opening area of separating plate 1 axially into fan 5. The air flow conveyed out radially by fan 5 is deviated by fan cowl 9. The air flow is discharged in the axial direction along the gear housing. In the discharge area of fan cowl 9, the narrowing brings about a nozzle effect and thus an increase in the flow velocity of the exiting air flow.

The radially directed air inlet is made possible by cover plate 12. Thus, input shaft 8 is connectable to a driving shaft of an electric motor driving the gear unit.

The axial area covered by fan cowl 9 includes the axial area covered by fan blades 7 and at least partially also the axial area covered by air baffles 4.

Fan cowl 9 and separating plate 1 may be produced in one piece, especially from a sheet metal, particularly sheet steel. A particularly inexpensive and uncomplicated manufacture is achievable by fabrication as a stamped bent part. A two-piece implementation is also advantageous, especially in the case of small piece numbers.

The fan cowl has a rectangular cross-section, particularly if the normal of the intersection of the cross-section is parallel to the axis of the input shaft.

To reduce turbulence losses, air baffles 4 are set apart axially from fan 5.

Fan blades 7 are not set apart uniformly from each other in the circumferential direction, so that losses, especially structure-borne-noise losses and airborne-noise losses are reducible. Preferably nine fan blades 7 are provided.

The hub of the fan impeller is conical, the circumference of the hub increasing in the direction of flow to divert the air in the radial direction.

As shown in FIG. 3, six radially long-extending air baffles 4 are provided in the circumferential direction, and two further radially short-extending air baffles 40, which are located in the upper and in the lower area of fan cowl 9.

The pressure side and the suction side are thus separated by separating plate 1. The opening in separating plate 1 for the air entry is cut out in the shape of a circle, the midpoint of the circle lying on the imaginary axis of the input shaft.

Nozzle 3 is able to be produced easily by bending the rear edge of fan cowl 9. The bend has an angle between 10° and 40°.

Cover plate 12 conducts the air from radially outside to radially further inside. Therefore, an arbitrary attachment may be provided at the axial end area of the input shaft facing away from fan 5. This is because these attachments extending further away axially from the cover plate and the gear unit have no significant influence on the air flow, for cover plate 12 permits the inflow of the cool surrounding air from the radial direction. Thus, even if the attachments have a hot surface, no air flow transports heat from the attachments into the fan. In particular, a coupling between the driving electric motor and the gear unit, especially the input shaft of the gear unit, is thus able to be set up. Even in the case of a fluid coupling disposed at input shaft 8, thus, a hydraulically-operating coupling which has a great extension in the radial direction, the admission of cool air to fan 5 is nevertheless able to be brought about by cover plate 12.

Cover plate 12 is joined to fan cowl 9 via an access-protection housing part 14. Access-protection housing part 14 has cutouts which are small enough that no adult human finger passes through, but large enough to admit the air flow with as little resistance as possible.

In addition, cover plate 12 permits a flow of air from all angle-at-circumference positions. In so doing, a uniform distribution is achieved.

Figure 4:
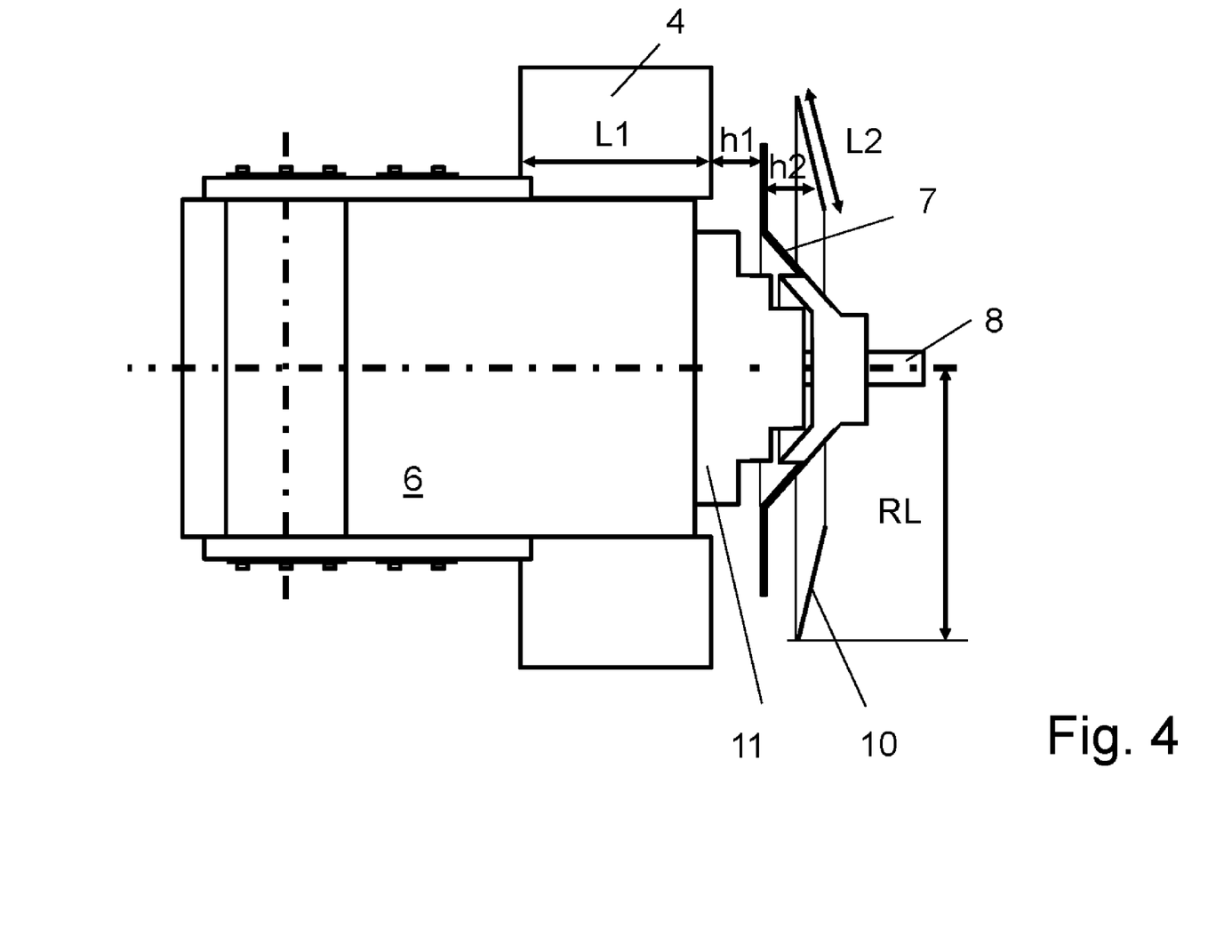
In FIG. 4, the fan cowl is removed in the cross-section according to FIG. 1.
Figure 5:
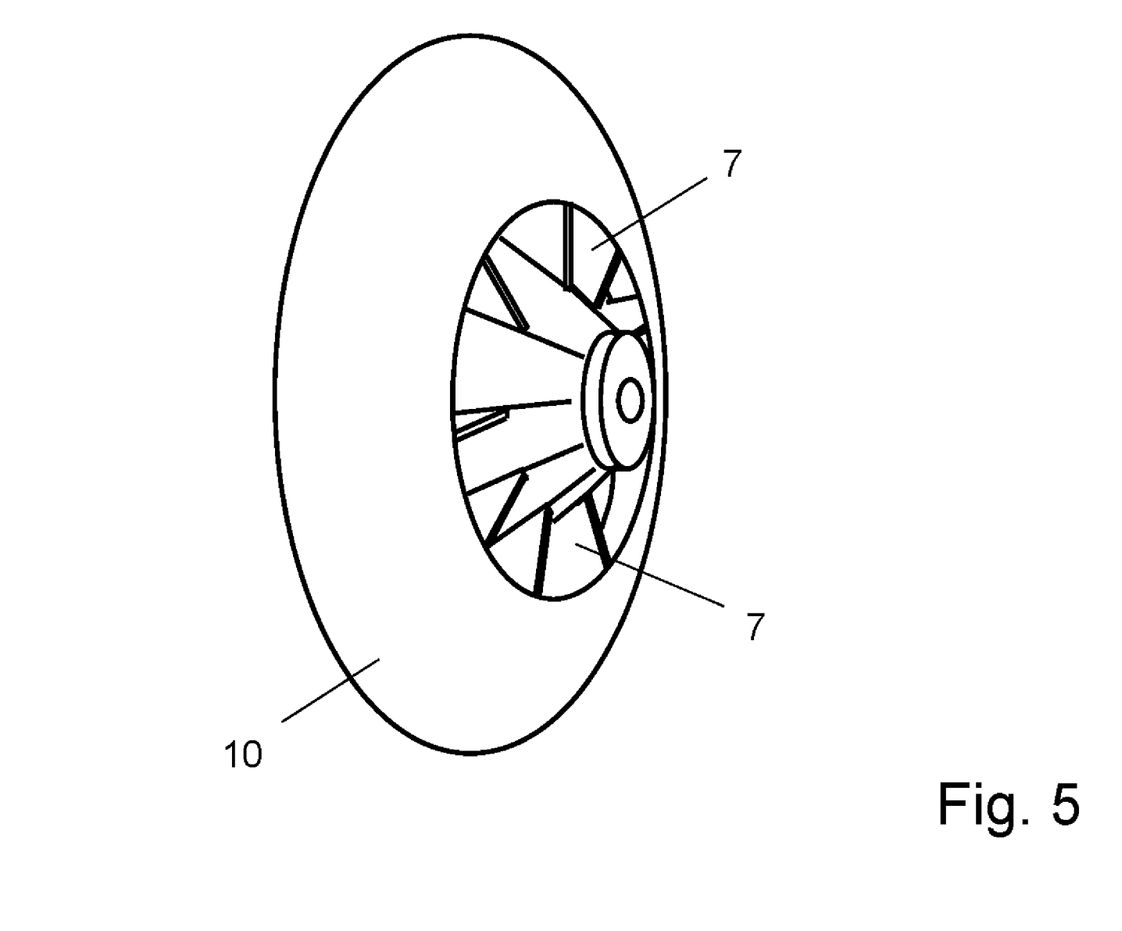
FIG. 5 shows an oblique view from a first viewing direction toward fan 5.
Figure 6:
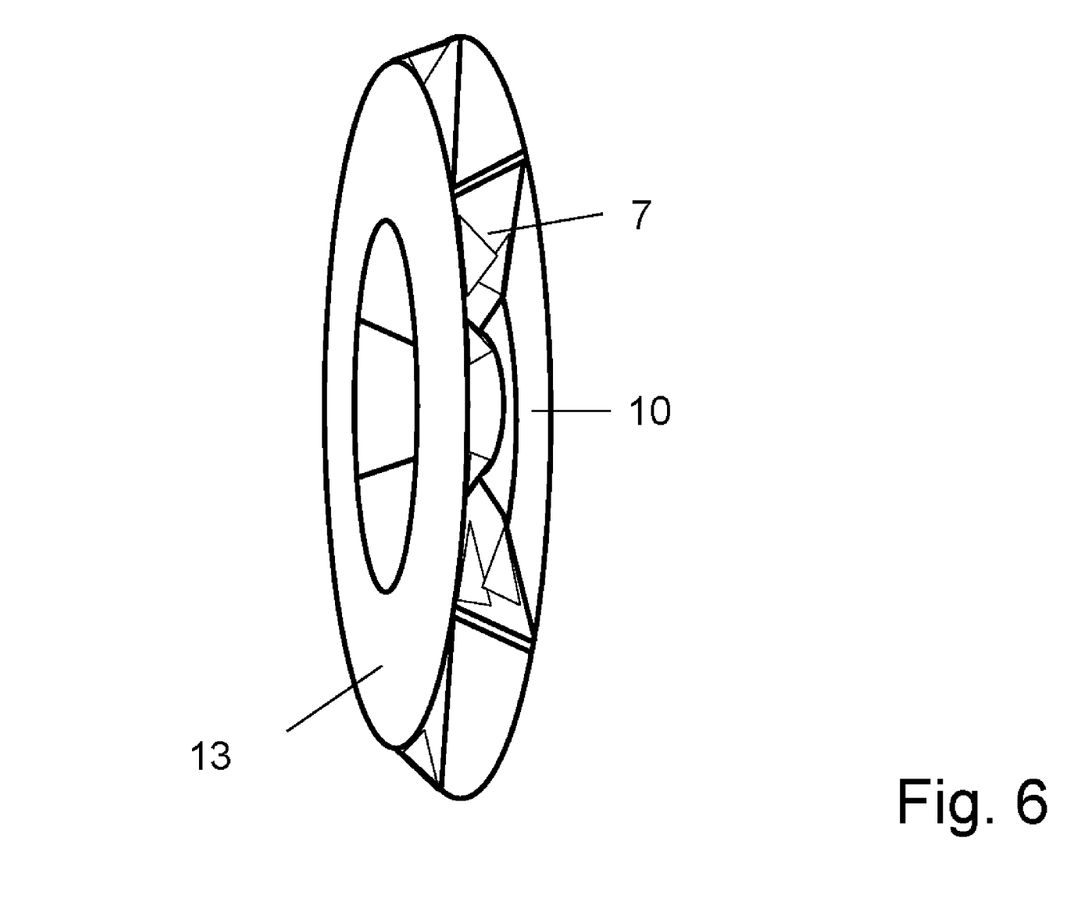
FIG. 6 shows an oblique view from another viewing direction toward fan 5.

Outlet cross-section Q3 is preferably between 1.1 times and 1.3 times greater than inlet cross-section Q1. Impeller-channel length L2 shown in FIG. 4 amounts to between 0.3 times and 0.5 times the fan radius RL. The specific impeller channel is bounded at least in the circumferential direction by the two respective next-adjacent fan blades 7, and in the axial direction by upper cover disk 10 on one side and lower cover disk 13 on the other side.

Preferably, the separating plate adjoins the fan impeller, a spacing, thus a gap, being provided, the width of the gap, especially thus the radial-distance area covered by the gap, being less than 10%, particularly less than 5%, especially less than 5% and greater than 0.1%, of the outside diameter of the fan impeller.

In the case of further exemplary embodiments of the present invention, cover plate 12 has cutouts, so that in addition, an axial air inlet is also made possible.

Figure 2:
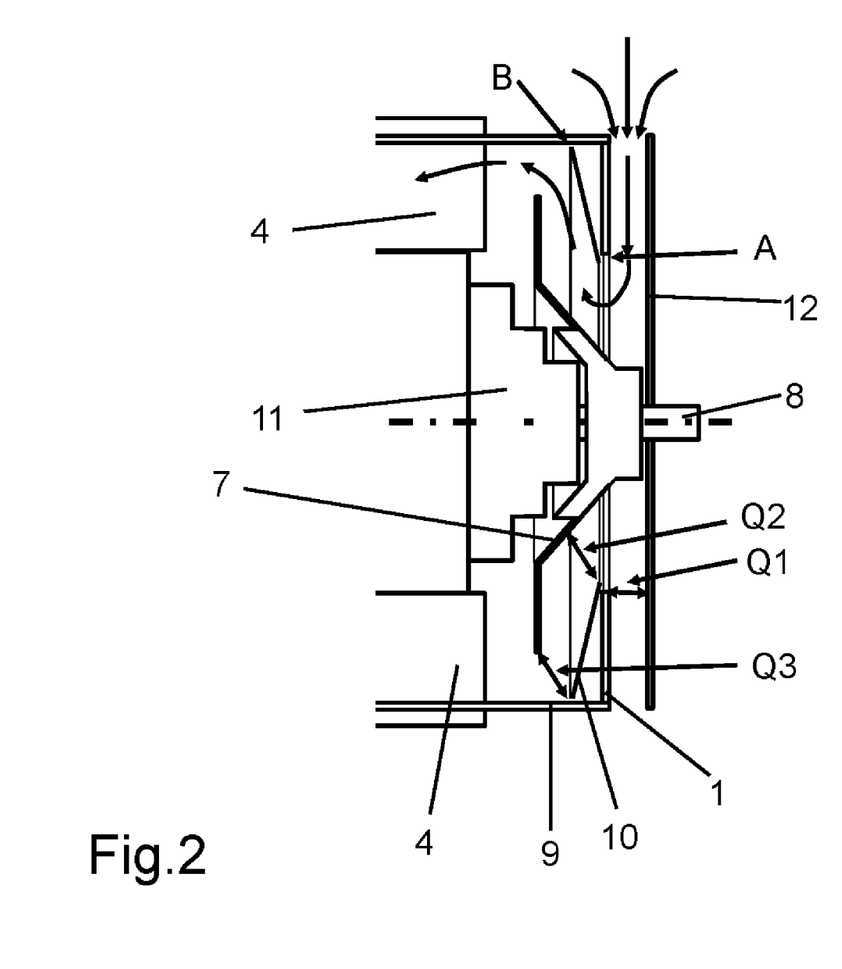
FIG. 2 shows a section from FIG. 1 around fan 5.

In other exemplary embodiments according to the present invention, in contrast to FIG. 2, separating plate 1 does not adjoin the inside radius of fan 5, but rather the outside radius, in both cases a small spacing existing in the radial direction between separating plate 1 and fan 5 in order to avoid contact. However, the spacing is selected to be as small as possible in consideration of manufacturing tolerances, so that losses due to turbulence of the flow, especially reactive turbulent currents, remain small.

In further exemplary embodiments of the present invention, separating plate 1 is not realized in one piece with the remaining fan cowl, thus permitting easy replacement.

LIST OF REFERENCE SYMBOLS

1 Separating plate
2 Air-inlet area
3 Nozzle
4 Air baffle
5 Fan
6 Gear unit
7 Fan blade
8 Input shaft
9 Fan cowl
10 Upper cover disk
11 Conical pot-type housing
12 Cover plate
13 Lower cover disk
14 Access-protection housing part
15 Gear-housing edge
40 Air baffle
A Opening cross-section
Q1 Inlet cross-section
Q2 Channel cross-section
Q3 Outlet cross-section

What is claimed is:
1. A gear unit, comprising:
a gear housing;
a shaft;
a fan impeller being joined in rotatably fixed manner to the shaft,
a fan cowl that at least partially surrounds the fan impeller and mounted on the gear housing;
a separating plate joined to the fan cowl and for separating a pressure chamber of a fan from a suction chamber of the fan; and
plate-shaped air baffles extending between and in contact with the fan cowl and the gear housing, extending axially along at least a portion of the gear housing, and extending in a radial direction relative to a rotational axis of the shaft, the baffles being adapted to prevent and/or reduce a swirl of air flowing out of the fan cowl, the air baffles being set apart axially from the fan impeller;
wherein the separating plate includes an air inlet for the fan impeller and is disposed on a side of the fan impeller facing away axially from the gear unit; and wherein:
the fan impeller has an upper cover disk and a lower cover disk that are set apart axially from each other, fan blades of the fan impeller are disposed between the upper and lower cover disks, and
at least one of the upper and lower cover disks is conical, the conical cover disk including a central air inlet opening.

2. The gear unit as recited in claim 1, wherein the shaft is an input shaft.

3. A gear unit, comprising:
a gear housing;
a shaft;
a fan impeller being joined in rotatably fixed manner to the shaft,
a fan cowl that at least partially surrounds the fan impeller and mounted on the gear housing;
a separating plate joined to the fan cowl and for separating a pressure chamber of a fan from a suction chamber of the fan; and
plate-shaped air baffles extending between and in contact with the fan cowl and the gear housing, extending axially along at least a portion of the gear housing, and extending in a radial direction relative to a rotational axis of the shaft, the baffles being adapted to prevent and/or reduce a swirl of air flowing out of the fan cowl, the air baffles being set apart axially from the fan impeller;
wherein:
the fan has the fan impeller,
the fan impeller has an upper cover disk and a lower cover disk that are set apart axially from each other, fan blades of the fan impeller are disposed between the upper and lower cover disks,
the separating plate has an air inlet for the fan impeller and is disposed on the side of one of the upper cover disk and the lower cover disk facing away axially from the gear unit, and
at least one of the upper and lower cover disks is conical, the conical cover disk including a central air inlet opening.

4. The gear unit as recited in claim 3, wherein the fan impeller is a radial-flow fan impeller.

5. The gear unit as recited in claim 4, wherein the fan blades of the fan impeller are set apart irregularly from each other in a circumferential direction.

6. The gear unit as recited in claim 3, wherein the separating plate adjoins the fan impeller, a spacing being provided which prevents the separating plate and fan impeller from touching, and permits no substantial return flow from the pressure chamber into the suction chamber.

7. The gear unit as recited claim 3, wherein the separating plate adjoins the fan impeller, one of a spacing and a gap being provided, a width of the gap, and a radial-distance area covered by the gap, being less than 10% of an outside diameter of the fan impeller.

8. The gear unit as recited claim 3, wherein the separating plate adjoins the fan impeller, one of a spacing and a gap being provided, a width of the gap, and a radial-distance area covered by the gap, being less than 5% of an outside diameter of the fan impeller.

9. The gear unit as recited claim 3, wherein the separating plate adjoins the fan impeller, one of a spacing and a gap being provided, a width of the gap, and a radial-distance area covered by the gap, being less than 5% and greater than 0.1% of an outside diameter of the fan impeller.

10. The gear unit as recited in claim 3, wherein at least one of:
at least one of the fan cowl and the gear housing is rectangular, and
an outside diameter of the fan impeller is at least one of greater than a width of the gear housing and less than a height of the gear housing.

11. The gear unit as recited in claim 3, wherein the fan cowl is formed as a nozzle in an air-outlet area, so that a discharging air flow streams along the gear housing.

12. The gear unit as recited in claim 11, wherein at least one of:
a cover plate is set apart axially from the separating plate, and
the fan cowl, together with the separating plate, is realized as a stamped bent part.

13. The gear unit as recited in claim 12, wherein the nozzle is implemented by positioning one edge of the fan cowl in an air-outlet area, an inclination angle of the edge of the fan cowl being between 10° and 40°.

14. The gear unit as recited in claim 3, further comprising:
a cover plate set apart axially from the separating plate, so that air enters from a radial direction.

15. The gear unit as recited in claim 14, wherein the cover plate includes cutouts to permit air to flow in axially.

16. The gear unit as recited in claim 14, further comprising:
an access-protection housing part via which the cover plate is retained on the separating plate and disposed between the cover plate and the separating plate.

17. The gear unit as recited in claim 3, wherein the separating plate is detachably joined to the fan cowl, so that by exchanging the separating plate, fan impellers of different sizes may be provided in the fan cowl.

18. The gear unit as recited in claim 3, wherein an outside radius of the fan impeller is greater than a width of the gear unit and less than a height of the gear unit.

19. The gear unit as recited in claim 3, wherein an outside radius of the fan impeller is less than a width of the gear unit and less than a height of the gear unit, a radius of an opening in the separating plate being essentially equal to an outside radius of a fan-impeller air-inlet area formed by channels of the fan impeller.

20. The gear unit as recited in claim 3, wherein at least one of:
the fan impeller has an upper cover disk and a lower cover disk which are set apart axially from each other, and fan blades are disposed between the upper and lower cover disks, so that channels are formed, and
a channel cross-section increases monotonically from an inlet location on the fan impeller lying radially further inside to an outlet location on the fan impeller lying radially further outside.

21. The gear unit as recited in claim 20, wherein:
the inlet location is implemented at an axial position, an inlet-location area being an area extending only radially and in a circumferential direction, and
an outlet-location area being an area extending in a radial direction, in the circumferential direction, and in an axial direction.

* * * * *